US008336200B2

(12) United States Patent
Storrs et al.

(10) Patent No.: US 8,336,200 B2
(45) Date of Patent: Dec. 25, 2012

(54) APPARATUS, SYSTEM, AND METHOD FOR MAINTAINING PART ORIENTATION DURING MANUFACTURING

(75) Inventors: Bart J. Storrs, Highland, UT (US); Michael A. Griffin, American Fork, UT (US)

(73) Assignee: SG Design Technologies, Highland, UT (US)

( * ) Notice: Subject to any disclaimer, the term of this patent is extended or adjusted under 35 U.S.C. 154(b) by 0 days.

(21) Appl. No.: 12/363,641

(22) Filed: Jan. 30, 2009

(65) Prior Publication Data

US 2009/0133241 A1 May 28, 2009

Related U.S. Application Data

(63) Continuation-in-part of application No. 11/420,703, filed on May 26, 2006, now Pat. No. 7,875,228.

(51) Int. Cl.
*H01R 43/00* (2006.01)
*B28B 3/06* (2006.01)

(52) U.S. Cl. ....................... 29/827; 264/297.1

(58) Field of Classification Search .......... 29/827; 264/297.1, 297.2, 259, 299
See application file for complete search history.

(56) References Cited

U.S. PATENT DOCUMENTS

| | | | | |
|---|---|---|---|---|
| 2,584,916 | A * | 2/1952 | Poux | 264/161 |
| 4,008,302 | A * | 2/1977 | Erlichman | 264/156 |
| 4,230,387 | A * | 10/1980 | Zahn | 439/590 |
| 4,586,607 | A * | 5/1986 | Dubbs et al. | 206/716 |
| 4,617,733 | A * | 10/1986 | Olson | 29/874 |
| 5,019,209 | A * | 5/1991 | Hiraide et al. | 216/14 |
| 5,148,596 | A * | 9/1992 | Zahn | 29/842 |
| 5,207,966 | A * | 5/1993 | Adkins et al. | 264/250 |
| 5,337,468 | A * | 8/1994 | Zahn | 29/842 |
| 5,428,890 | A * | 7/1995 | Zahn | 29/867 |
| 5,478,051 | A * | 12/1995 | Mauer | 264/156 |
| 5,616,053 | A * | 4/1997 | Bogursky et al. | 439/590 |
| 5,619,794 | A * | 4/1997 | Hokazono | 29/883 |
| 5,725,392 | A * | 3/1998 | Bianca et al. | 439/590 |
| 5,775,945 | A * | 7/1998 | Bianca et al. | 439/590 |
| 5,830,012 | A * | 11/1998 | Ortega et al. | 439/590 |
| 5,927,373 | A * | 7/1999 | Tobin | 164/36 |
| 5,967,841 | A * | 10/1999 | Bianca et al. | 439/590 |
| 6,146,199 | A * | 11/2000 | Ortega et al. | 439/590 |
| 6,344,160 | B1 * | 2/2002 | Holtzberg | 264/102 |

(Continued)

OTHER PUBLICATIONS

PCT/US2007/069687, International Preliminary Report on Patentability, Mar. 12, 2009.

(Continued)

*Primary Examiner* — David Angwin
(74) *Attorney, Agent, or Firm* — Kunzler Law Group, PC

(57) ABSTRACT

A method for maintaining orientation of a part during manufacturing includes feeding a carrier a supply apparatus. The carrier includes a flexible material and supports a plurality of manufactured parts and includes indexing parts and the supply apparatus stores the carrier. The method includes feeding the carrier into a part forming module to form a manufactured part, forming a plurality of manufactured parts onto the carrier and determining a position of the carrier by sensing the indexing marks. The carrier includes a plurality of parts formed onto the carrier and each manufactured part is connected to the carrier with connectors that hold the part from the carrier. The width of the connector less than or equal to the connector at a connection point to the carrier. Each part maintains orientation with respect to the carrier where the part is formed and maintains orientation during a subsequent operation.

23 Claims, 10 Drawing Sheets

U.S. PATENT DOCUMENTS

| | | | |
|---|---|---|---|
| 7,037,761 B2* | 5/2006 | Hedler et al. | 438/127 |
| 7,134,197 B2* | 11/2006 | Shiffer et al. | 29/840 |
| 7,556,759 B2* | 7/2009 | Hiemstra et al. | 264/297.1 |
| 7,875,228 B2 | 1/2011 | Storrs et al. | 264/297.1 |
| 2002/0195701 A1* | 12/2002 | Bemmerl et al. | 257/706 |
| 2004/0051205 A1* | 3/2004 | Bouquet et al. | 264/234 |
| 2004/0093721 A1* | 5/2004 | Watson | 29/729 |
| 2004/0154529 A1* | 8/2004 | Nogiwa et al. | 117/200 |
| 2004/0233647 A1* | 11/2004 | Ogawa et al. | 361/752 |
| 2005/0037543 A1* | 2/2005 | Tsumura et al. | 438/123 |
| 2005/0136569 A1* | 6/2005 | Shiffer et al. | 438/107 |
| 2006/0208583 A1* | 9/2006 | Ueno et al. | 310/71 |

OTHER PUBLICATIONS

PCT/US2007/069687, International Search Report and Written Opinion, Sep. 29, 2008.

* cited by examiner

APPARATUS, SYSTEM, AND METHOD FOR MAINTAINING PART ORIENTATION DURING MANUFACTURING

CROSS-REFERENCES TO RELATED APPLICATIONS

This application is a continuation-in-part of and claims priority to U.S. Provisional patent application Ser. No. 11/420,703 entitled "Apparatus, System, and Method for Maintaining Part Orientation During Manufacturing" and filed on May 26, 2006 for Bart J. Storrs, et al., which is incorporated herein by reference.

FIELD OF THE INVENTION

This invention relates to manufacturing of parts and more particularly relates to maintaining orientation of parts during manufacturing.

BACKGROUND

Injection molding, cast metal fabricating, metal stamping, and other manufacturing processes often require multiple steps. For example a manufactured part may be initially formed during one step of a manufacturing process. In another step of the manufacturing process, the manufactured part may be painted, plated, silk screened with a logo, machined, placed in an assembly, or other process. Often parts are created by forming the part in a manufacturing machine using some sort of mold or dye.

For example raw plastic is fed into an injection molding machine and the mold is filled with raw plastic through a sub-gate into a mold. Once plastic has filled the mold, the injection molding machine opens the mold and the manufactured part falls into a bin. The manufactured part loses orientation as it falls into the bin. Parts formed using a cast metal process, a stamped metal process, and the like may also be dropped into a bin after the parts are formed.

Where the manufacturing process involves another step, the manufactured parts must be reoriented into a position for another machine to place the part, silkscreen a logo onto the part, place the part in a container for shipping, plate a portion of the part, etc. Manually reorienting manufactured parts is usually labor intensive or may involve an expensive machine to pick the parts or vibrate the parts into a correct position.

Another way to maintain orientation of manufactured parts may involve some type of conveyer belt, assembly line, or the like. Parts may be moved onto a conveyer right from the manufacturing machine that formed the part. Moving the manufactured parts without losing orientation of the part may be tricky and expensive. In addition, conveyers, assembly lines, etc. may also be expensive.

From the foregoing discussion, it should be apparent that a need exists for an apparatus, system, and/or method that maintain orientation of a manufactured part throughout a manufacturing process. Beneficially, such an apparatus, system, and method would provide a carrier that would allow a manufactured part to be formed onto prongs of the carrier. The carrier may be uncoiled from a reel into a manufacturing machine and then coiled onto another reel with the manufactured parts held in a correct orientation.

SUMMARY OF THE INVENTION

From the foregoing discussion, it should be apparent that a need exists for an apparatus, system, and/or method that maintain orientation of a manufactured part throughout a manufacturing process. Beneficially, such an apparatus, system, and method would provide a carrier that would allow a manufactured part to be formed onto prongs of the carrier or directly onto the carrier. The carrier may be uncoiled from a reel into a part forming module and then coiled onto another reel with the manufactured parts held in a correct orientation.

The present invention has been developed in response to the present state of the art, and in particular, in response to the problems and needs in the art that have not yet been fully solved by currently available manufacturing methods. Accordingly, the present invention has been developed to provide an apparatus, system, and method for maintaining orientation of a manufactured part during a manufacturing process that overcome many or all of the above-discussed shortcomings in the art.

A method of the present invention is presented for maintaining orientation of a manufactured part during a manufacturing process. The method in the disclosed embodiments substantially includes the steps necessary to carry out the functions presented below with respect to the operation of the described system and apparatus. The method includes feeding a carrier from at least one supply apparatus where the carrier is a flexible material. The supply apparatus stores the carrier such that the carrier may be fed from the supply apparatus.

The method includes feeding the carrier into a part forming module used by a manufacturing process to form a manufactured part. The method includes forming the manufactured part onto the carrier as the carrier is fed into the part forming module. The carrier is of sufficient length such that a plurality of manufactured parts may be formed onto the carrier in a plurality of part forming steps. The manufactured parts are formed onto the carrier such that each manufactured part maintains orientation with respect to the portion of the carrier where the manufactured part is formed. The manufactured part maintains orientation during an operation subsequent to forming the manufactured part.

In one embodiment, the manufactured part is formed onto at least one prong protruding from the carrier. The at least one prong and the carrier maintain orientation of the manufactured part with respect to the portion of the carrier where the manufactured part is formed.

In another embodiment, each manufactured part includes a connector where the connector of a manufactured part includes a portion of the manufactured part. Forming each manufactured part onto the carrier includes forming the connector of each manufactured part onto the carrier such that a connector and an associated manufactured part maintain orientation of the manufactured part with respect to the portion carrier where the connector was formed. In another embodiment, multiple connectors are formed onto multiple carriers as the part is manufactured.

In one embodiment, the method includes gathering the carrier and the manufactured parts formed onto the carrier onto a take-up apparatus. The take-up apparatus accommodates the carrier and the manufactured parts while maintaining orientation of the manufactured part with respect to the portion of the carrier where the manufactured part was formed. In another embodiment, the supply apparatus is a supply reel, a supply spindle, a supply spool, a supply container, or a supply coiling apparatus. The supply reel stores the carrier coiled onto the supply reel. The supply container houses the carrier. The supply coiling apparatus stores the carrier coiled around the coiling apparatus. The supply coiling apparatus is a shape other than that of a reel.

In one embodiment, the take-up apparatus is a take-up reel, a take-up spindle, a take-up spool, a take-up container, or a take-up coiling apparatus. The take-up reel stores the carrier and each manufactured part by coiling them onto the take-up reel. The take-up container houses the carrier and each manufactured part. The take-up coiling apparatus stores the carrier and each manufactured part by coiling them around the coiling apparatus. The take-up coiling apparatus is a shape other than that of a reel. Each manufactured part maintains orientation with respect to the portion of the carrier where each manufactured part was formed while residing on the take-up reel, in the take-up container, and on the take-up coiling apparatus.

In one embodiment, at least a portion of the manufacturing process includes an injection molding process. In another embodiment, at least a portion of the manufacturing process includes a cast metal process. In one embodiment, the carrier includes two or more carriers and the manufactured part is formed onto the two or more carriers. In another embodiment, the two or more carriers uncoil from two or more supply apparatuses. In an alternate embodiment, the two or more carriers uncoil from one supply apparatus. In different embodiments, the carrier is a wire, a metal strip, a cardboard strip, a paper strip, a plastic strip, a polymeric material, a cloth strip, or a combination of materials.

In one embodiment, the carrier further includes an indexing mechanism that facilitates advancing the carrier to a predetermined location in the part forming module to form the manufactured part. The indexing mechanism, in another embodiment, includes one or more indexing holes in the carrier. In another embodiment, the carrier contains indexing marks and a reader reads the indexing marks on the carrier to position the carrier.

In another embodiment, the method includes uncoiling the carrier and the manufactured part into a second part forming module for further processing of the manufactured part. In another embodiment, the further processing includes a silk screening process, a painting process, a plating process, or an assembly process. The method, in another embodiment, includes uncoiling the carrier and the manufactured part into a trimming and placement assembly that trims the manufactured part from the carrier and places the manufactured part.

A system of the present invention is also presented to maintain orientation of a manufactured part during a manufacturing process. The system includes a part forming module used by a manufacturing process, at least one supply apparatus, a carrier stored by the supply apparatus made of a flexible material, a feeder module that feeds the carrier from the supply apparatus into the part forming module and a part forming module. The part forming module forms a manufactured part onto the carrier. The carrier is of sufficient length such that a plurality of manufactured parts may be formed onto the carrier in a plurality of part forming steps. Each manufactured part is formed onto the carrier such that each manufactured part maintains orientation with respect to the portion of the carrier where the manufactured part is formed. Each manufactured part also maintains orientation during an operation subsequent to forming the manufactured part.

In one embodiment, the system includes a take-up apparatus where the carrier is gathered with the take-up apparatus as the carrier exits a portion of the manufacturing process. The system may further include a holder assembly that positions the at least one supply apparatus on one side of the part forming module and to position the take-up apparatus on a second side of the part forming module.

An apparatus to maintain orientation of a manufactured part during a manufacturing process is provided and includes a feeder module that feeds from at least one supply apparatus into a part forming module used by a manufacturing process. The carrier is made of a flexible material. The supply apparatus stores the carrier such that the carrier can be fed from the supply apparatus.

The apparatus includes a part forming module that forms a plurality of manufactured parts onto the carrier as the carrier is fed into the part forming module. The carrier is of sufficient length such that a plurality of manufactured parts may be formed onto the carrier in a plurality of part forming steps. Each manufactured part is formed onto the carrier such that each manufactured part maintains orientation with respect to the portion of the carrier where the manufactured part is formed. Also, each manufactured part maintains the orientation during an operation subsequent to forming the manufactured part.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
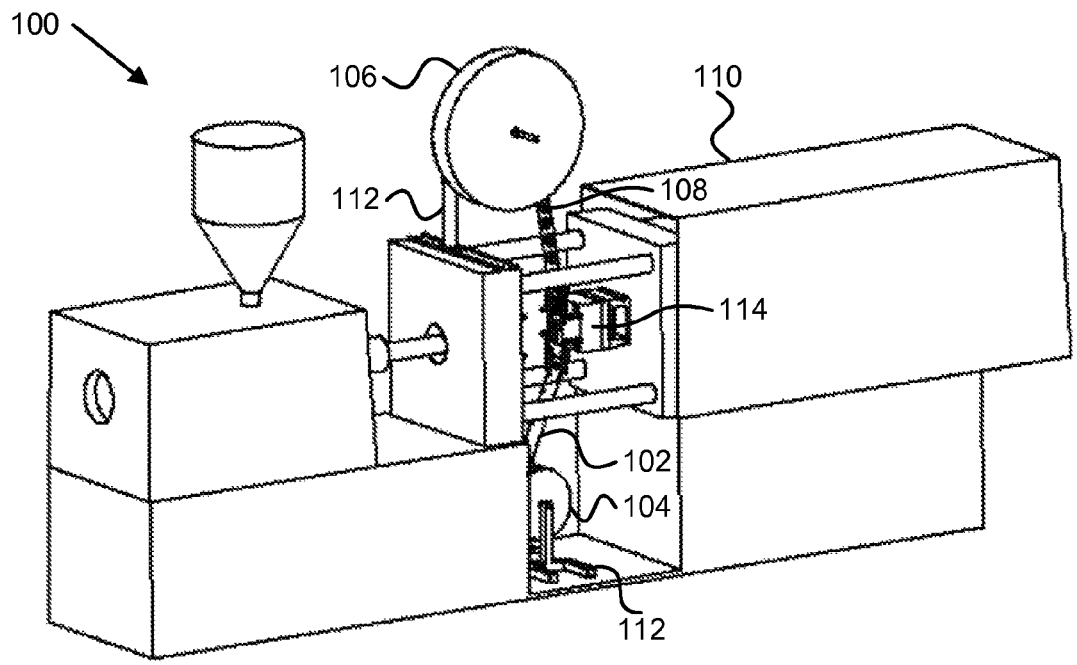
FIG. 1A is a schematic block diagram illustrating one embodiment of a system for maintaining orientation of a manufactured part during a manufacturing process in accordance with the present invention.
Figure 1B:
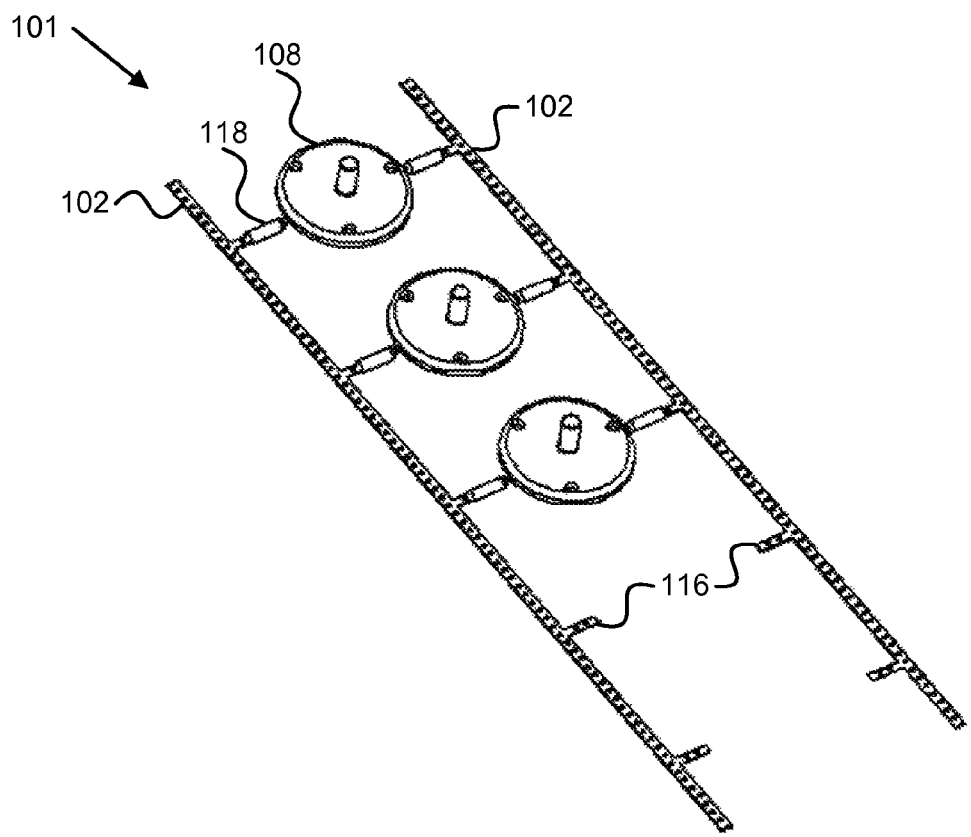
FIG. 1B is a schematic block diagram illustrating a more detailed view of the embodiment of a system for maintaining orientation of a manufactured part during a manufacturing process in accordance with the present invention.
Figure 1C:
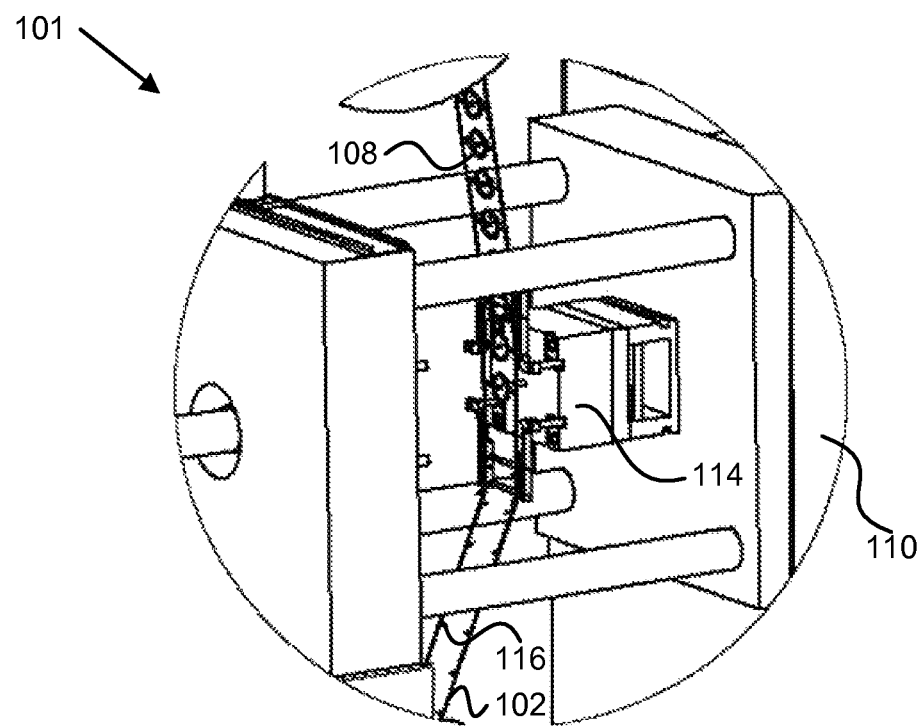
FIG. 1C is a schematic block diagram illustrating another detailed view of the embodiment of a system for maintaining orientation of a manufactured part during a manufacturing process in accordance with the present invention.

FIG. 1A is a schematic block diagram illustrating one embodiment of a system 100 for maintaining orientation of a manufactured part 108 during a manufacturing process in accordance with the present invention. FIGS. 1B and 1C are more detailed views of the embodiment of the system 100. The system 100 includes a carrier 102, at least one supply apparatus 104, a take-up apparatus 106, a manufactured part 108, a part forming module 110, a holder assembly 112, a mold 114, prongs 116, and a connector 118, which are described below.

The system 100 includes a carrier 102 that feeds from at least one supply apparatus 104 into the part forming module 110 and that feeds onto a take-up apparatus 106. The carrier 102 also includes at least one prong 116 protruding from the carrier 102. The prong 116 and the carrier 102 are configured to maintain orientation of a manufactured part 108 with respect to the carrier 102. In one embodiment there are several supply apparatuses 104 and several take-up apparatuses 106.

The carrier 102 is typically flexible and may be constructed of a plurality of materials. The carrier 102 may include a wire, a metal strip, a cardboard strip, a paper strip, a plastic strip, a polymeric material, a cloth strip, or the like. In one embodiment, the carrier 102 is composed of a composite material. In another embodiment, the carrier 102 is composed of multiple materials such as an embodiment in which the carrier 102 contains a metal core and a plastic exterior. In one embodiment, the carrier 102 is plated with a hard material to give the carrier 102 a more rigid structure while still allowing the carrier 102 to bend. In another embodiment, the carrier 102 is made completely of pliable material to allow the carrier 102 to bend and coil while still allowing it to maintain orientation of the manufactured part 108 with respect to the portion of the carrier 102 on which the manufactured part 108 is attached. In one embodiment, the carrier 102 is sufficiently flexible to be coiled and uncoiled from a reel.

In one embodiment, the carrier 102 is configured to fold onto itself. In another embodiment, the carrier 102 is configured to be cut into strips and shipped while still attached to the manufactured parts 108.

The carrier 102 may be constructed with a plurality of cross sectional shapes. In one embodiment, the carrier 102 has a cylindrical cross sectional shape like that of a wire. In another embodiment, the cross sectional shape of the carrier 102 is a flat rectangular shape. In another embodiment, the cross sectional shape of the carrier 102 is arched to retain the rigidity of the carrier 102. In another embodiment, the cross sectional shape of the carrier 102 is an I-beam to increase strength. In another embodiment, at least a portion of the carrier 102 has a circular cross-sectional shape. In another embodiment, at least a portion of the carrier 102 has a rectangular cross sectional shape. In one embodiment, at least a portion of the carrier 102 has an annular cross section. In another embodiment, the carrier 102 has a solid cross section. In another embodiment, at least a portion of the carrier 102 has a planar shape. One of skill in the art will recognize other materials and shapes used to form a carrier 102.

The carrier 102 may be constructed in a plurality of lengths. In a preferred embodiment, the carrier 102 is of a sufficient length to allow multiple manufactured parts 108 to be formed onto a single carrier 102. Each manufactured part 108 is formed onto the carrier 102 such that each manufactured part 108 maintains orientation with respect to the portion of the carrier 102 where the manufactured part 108 is formed. The orientation of each manufactured part 108 is maintained by the carrier 102 such that a plurality of part forming processes may be performed on the manufactured part 108 without subsequent re-orientation. In one embodiment, slight re-orientation may be required for precision manufacturing. In another embodiment, no re-orientation is needed for subsequent manufacturing processes because the orientation is sufficiently maintained by the carrier 102. In one embodiment, the carrier 102 is constructed from a plurality of separate carrier 102 sections that are connected together. The separate carrier 102 sections may be connected permanently or temporarily.

In one embodiment, the system 100 includes multiple carriers 102 that are fed into the part forming module 110 and the manufactured part 108 is formed onto the multiple carriers 102. The multiple carriers 102 may be fed from one or more supply apparatuses 104. The multiple carriers 102 may include a top carrier 102 and a bottom carrier 102, side carriers 102, etc.

In one embodiment, the carrier 102 is constructed of a disposable material so that when the manufactured part 108 is removed from the carrier 102, the carrier 102 may be disposed of. In another embodiment, the carrier 102 is constructed from a material that is reused by forming other manufactured parts 108 thereon. In another embodiment, the carrier 102 is constructed of a material that can be melted and then reformed into the new carrier 102.

The carrier 102 can be made in a plurality of thicknesses. In one embodiment, the carrier 102 is constructed of a stronger, thicker material to support and maintain the orientation of heavier, larger manufactured parts 108. In another embodiment, the carrier 102 is constructed of weaker, thinner material to lower costs and support lighter manufactured parts 108.

The carrier 102 may be of various sizes and dimensions to support manufactured parts 108 of various sizes and weights. For example, a heavy or large manufactured part 108 may require a stronger carrier 102 than a small or light manufactured part 108. A larger part may require an inflexible, I-beam shape while a lighter manufactured part 108 may only require a flexible, flat rectangular shape. In one embodiment, the carrier 102 is generally inflexible but includes flex points that readily flex.

In one embodiment, surfaces of the carrier 102 are texturized to increase the adhesion between the carrier 102 and the manufactured part 108. The texture may include surface treatments that increase the number of pores and voids on the surface of the carrier 102 so that the manufactured part 108 will attach more readily to the carrier 102. In one embodiment, the carrier 102 contains through-holes that allow the manufactured part 108 to mechanically attach to the carrier 102 by actually forming around the carrier 102 and through the through-holes. Texturization or through-holes of the carrier 102 may also be used for a supply apparatus 104, a take-up apparatus 106, or other part of manufacturing machinery to grip and/or position the carrier 102.

The carrier 102, in one embodiment, includes a single carrier 102 with prongs 116. In another embodiment, the carrier 102 includes a top carrier 102 and a bottom carrier 102 with prongs 116 on both carriers 102 (as depicted in FIG. 1B). In another embodiment, a carrier 102 includes prongs 116 extending in more than one direction and may be used as a top carrier 102, a bottom carrier 102, a middle carrier 102, etc. to maintain orientation of manufactured parts 108 above, below, and in between one or multiple carriers 102. In another embodiment, rows of carriers 102 may support manufactured parts 108 in one or more dimensions. One of skill in the art will recognize other materials and shapes used to form a carrier 102 and recognize other carrier 102 configurations capable of feeding from supply apparatus 104 and feeding onto the take-up apparatus 106 and containing prongs 116 for receiving a manufactured part 108.

The manufactured part 108 is formed by the part forming module 110 onto at least one prong 116 of the carrier 102. The portion of the manufactured part 108 that forms on a prong 116 is referred to herein as a connector 118. In one embodiment, material used to form a manufactured part 108 is injected onto a prong 116, such as in an injection molding or cast metal process. In another embodiment, material used to form a manufactured part 108 is formed around a prong 116, such as in a stamped metal process. In yet another embodiment, a material is formed on or around a prong 116 where the material differs from that used to form a manufactured part 108 and serves only as a connector 118 from the manufactured part 108 to a prong 116.

Prongs 116 may be of various sizes and shapes and may be positioned on a carrier 102 at different positions with respect to each other. Prongs 116 may be located on the carrier 102 to accommodate different manufactured parts 108. A manufactured part 108 may be formed onto one or more prongs 116 of one or more carriers 102. For example, in one embodiment a manufactured part 108 may be formed onto a prong 116 of a top carrier 102 and a prong 116 of a bottom carrier 102 (as depicted in FIG. 1B). In another example, a manufactured part 108 may be formed onto two prongs 116 of a single carrier 102. One of skill in the art will recognize other ways to form a manufactured part 108 to create a connection onto a prong 116.

In one embodiment, the prongs 116 are spaced along a longitudinal axis of a carrier 102 at regular intervals. In one embodiment, the intervals at which the prongs 116 are spaced correspond to the necessary intervals required to accommodate the manufactured parts 108. In one embodiment, each manufactured part 108 is supported by several prongs 116.

The prong 116 may protrude from the carrier 102 in a plurality of directions. In one embodiment, the prong 116 protrudes from the carrier 102 in a direction perpendicular to the longitudinal axis of the carrier 102. In another embodiment, the prong 116 protrudes from the carrier 102 at an angle that is not perpendicular to the longitudinal axis. In one embodiment, a carrier 102 includes prongs 116 extending in more than one direction and a single carrier 102 may be used to support a manufactured part 108 in multiple dimensions.

The cross-sectional shape of the prong 116 may be round, square, oval, or any other shape capable of forming a prong 116. The surface of the prong 116 may be texturized to increase adhesion between the prong 116 and the connector 118. The size of the prong 116 may be large to support heavier manufactured parts 108 or small to minimize cost and support smaller manufactured parts 108. The shape of the prongs 116 may also be changed due to the weight of the manufactured part 108 to be supported. The prong 116 may be formed in an I-beam shape, an annular shape, a rectangular shape, a cylindrical shape, or another shape depending on the manufactured part 108 and the forming process.

In one embodiment, the prong 116 is constructed from the same material as the carrier 102. In another embodiment, the prong 116 is constructed from a material that is different than the material of the carrier 102. In one embodiment, the prong 116 is reinforced to support heavier manufactured parts 108.

The system 100 includes at least one supply apparatus 104 from which a carrier 102 with prongs 116 is supplied. The supply apparatus 104 stores the carrier 102 until the carrier 102 is dispersed from the supply apparatus 104.

Supply apparatuses 104 may come in various sizes and dimensions to accommodate various manufactured parts 108. The supply apparatus 104 may be a supply reel, a supply spindle, a supply spool, a supply container, a supply coiling apparatus or other like apparatus. In the embodiment of FIG. 1A, the supply apparatus 104 is a reel and the carrier 102 is coiled onto the reel. The carrier 102 is unwound from the reel and fed to the part forming module 110. In another embodiment, the supply apparatus 104 is a container which houses the carrier 102. In one embodiment, the container is a box from which the carrier 102 is retrieved. In one embodiment, the carrier 102 is folded in the box. In another embodiment, the carrier 102 is simply collected in the box.

In another embodiment, the supply apparatus 104 is a spool. The carrier 102 is wound on the entire width of the spool so that it is dispensed from the entire width of the spool. In another embodiment, the supply apparatus 104 is a coiling apparatus which stores the carrier 102 by coiling the apparatus. The coiling apparatus is a shape other than a reel, such as a cone shaped supply apparatus 104.

In one embodiment, a supply apparatus 104 accommodates a single carrier 102. In such an embodiment, multiple supply apparatuses 104, each containing a carrier 102, may be used together in the system 100. For example a top carrier 102 and a bottom carrier 102, each on separate supply apparatuses 104, may be used and oriented so the prongs 116 extend toward a center so that a manufactured part 108 may be formed onto to opposing prongs 116 (as depicted in FIG. 1B).

In another embodiment, a supply apparatus 104 contains multiple carriers 102. The supply apparatus 104 may or may not include channels or guides to hold the multiple carriers 102. In another embodiment, prongs 116 of the carriers 102 include a wire or other material between prongs 116 that may be either trimmed from the prongs 116 prior to forming a manufactured part 108 onto the prongs 116 or may remain between the prongs 116 to become an integral part of the manufactured part 108. In yet another embodiment, wire or other material may extend between carriers 102 and may form a prong 116. For example, a wire may extend between carriers 102 that may become part of an electronic device. The carriers 102 with wire in between may be coiled on one supply apparatus 104. One of skill in the art will recognize other configurations for supply apparatuses 104 from which a carrier 102 with prongs 116 may be fed.

The system 100 includes a take-up apparatus 106 configured to receive the carrier 102, the prongs 116, and the manufactured part 108 formed on the prongs 116 while maintaining orientation of the manufactured part 108 with respect to the carrier 102. The take-up apparatus 106 gathers the carrier 102 as it exits a portion of the manufacturing process.

Figure 4:
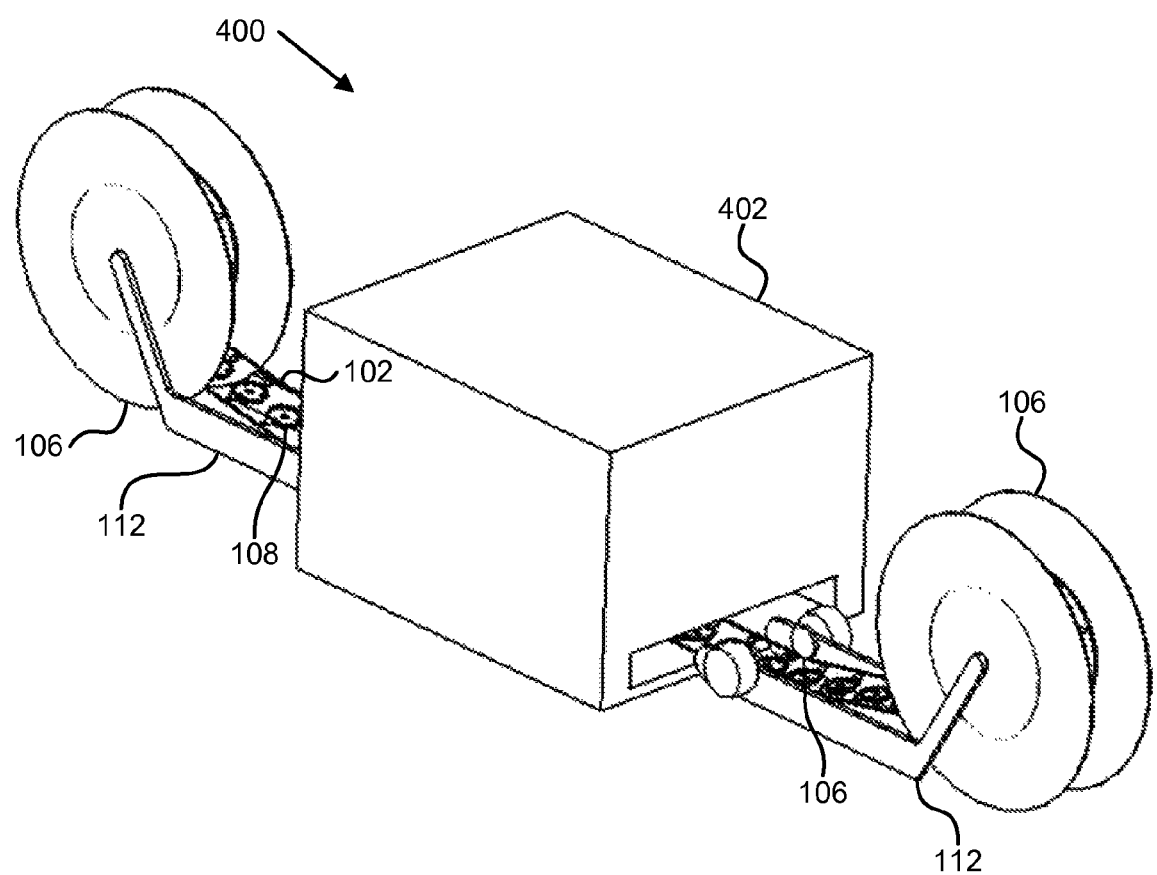
FIG. 4 is a schematic block diagram illustrating an embodiment of an apparatus for maintaining orientation of a manufactured part during a manufacturing process in a second processing step in accordance with the present invention.

The take-up apparatus 106 may take many forms. The take-up apparatus 106 may be a take-up reel, a take-up spindle, a take-up spool, a take-up container, a take-up coiling apparatus or other like apparatus. In the embodiment of FIGS. 1A and 4, the take-up apparatus 106 is a take-up reel which stores the carrier 102 and each manufactured part 108 coiled onto the take-up reel. In another embodiment, the take-up apparatus 106 is a take-up container which houses the carrier 102 and manufactured parts 108. In another embodiment, the take-up apparatus 106 is a take-up coiling apparatus which stores the carrier 102 and each manufactured part 108 coiled around the coiling apparatus. The take-up coiling apparatus is a shape other than that of a reel, such as a conical shape or a rectangular shape.

For example, the take-up coiling apparatus may include two shaft-like extensions protruding from either end of a long support structure. The support structure may rotate around a pivot point that will rotate the extensions and the carrier 102 and manufactured parts 108 may wrap around the extensions. Other configurations with more extensions are also contemplated in various configurations. With each embodiment of a take-up apparatus 106, each manufactured part 108 maintains orientation with respect to the portion of the carrier 102 where each manufactured part 108 was formed while residing on the take-up apparatus 106.

In one embodiment, the take-up apparatus 106 is a box into which the carrier 102 is fed. The carrier 102 may be organized in the box or may simply be placed in the box. In another embodiment, the take-up apparatus 106 is a spool. The carrier 102 may be wound over the entire length of the spool in a manner that allows space for the manufactured parts 108 connected with the carrier 102.

In one embodiment, maintaining orientation includes holding the manufactured part 108 in a fixed position with respect to the uncoiled carrier 102. Position may be maintained by forming the manufactured part 108 directly onto the carrier 102 or prongs 116 while the prongs 116 are attached to the carrier 102. In one embodiment, orientation of the manufactured part 108 may be altered while the carrier 102 is received by the take-up apparatus 106, but may be restored when the carrier 102 is uncoiled from the take-up apparatus 106.

The take-up apparatus 106 may accommodate one or more carriers 102 with at least one manufactured part 108 formed onto the carriers 102 or prongs 116 of the carriers 102. Take-up apparatuses 106 may come in various sizes and dimensions to accommodate various manufactured parts 108. In one embodiment, one take-up apparatus 106 is positioned to receive a carrier 102 and manufactured parts 108. In another embodiment, multiple take-up apparatuses 106 are used to receive one or more carriers 102 with attached manufactured parts 108.

In another embodiment, the system 100 may or may not include a take-up apparatus 106, but feeds the carrier 102 and attached manufactured parts 108 into one or more part forming modules 110 used for further processing. Further processing may include assembly, painting, silk screening, plating, trimming the manufactured parts 108 from the prongs 116, or any other manufacturing process. One of skill in the art will recognize other forms of one or more take-up apparatuses 106 used to receive a carrier 102 with attached manufactured parts 108 or systems 100 with or without a take-up apparatus 106.

The manufactured part 108 may be any part that can be made by any type of manufacturing process, automated or manual. In one embodiment, the manufactured part 108 is made through the use of a semi-automated manufacturing process. The manufactured parts 108 can be any size. In one embodiment, the manufactured parts 108 can range in size from automobile engine blocks to much smaller medical supply parts. The manufactured parts 108 can be made from a plurality of materials including plastics, metals, composites, foams, ceramics, cloth, or any other material.

In one embodiment, the manufactured part 108 is not removed from the carrier 102 but is sold with the carrier 102 attached. In another embodiment, the manufactured part 108 is removed from the carrier 102 to be shipped or sold. In another embodiment, a group of manufactured pieces is sold as a set while each is attached to the carrier 102.

The system 100 includes at least one connector 118. The connector 118 forms part of the manufactured part 108. In one embodiment, the connector 118 protrudes from the manufactured part 108. The connector 118 forms directly onto the carrier 102 or onto at least one prong 116 of the carrier 102 to maintain orientation of the manufactured part 108 with respect to the portion of the carrier 102 onto which the manufactured part 108 is formed or prong 116 is attached.

The connector 118 may be constructed in a plurality of shapes. In one embodiment, the shape of the connector 118 is determined by the shape and size of the manufactured part 108. In one embodiment, the connector 118 is cylindrical in shape and protrudes from the manufactured part 108. In another embodiment, the connector 118 is a flat, rectangular shape extending from the manufactured part 108. In another embodiment, the connector 118 is an I-beam shape to support heavier manufactured parts 108. One of skill in the art will recognize other connector 118 shapes.

In one embodiment, the connector 118 is formed from the same material as the manufactured part 108 and is formed during the same manufacturing process as the manufactured part 108. In another embodiment, the connector 118 is formed from a material that is different than the manufactured part 108 and is formed in a separate manufacturing process.

The connector 118 may protrude from the manufactured part 108 in a plurality of positions depending on the manufactured part 108. The connector 118 may protrude from the top, bottom or side of the manufactured part 108. Ideally, the connector 118 extends from a portion of the manufactured part 108 which allows for it to be easily removed when the part is prepared to be shipped or sold. In one embodiment, the connector 118 extends from a portion of the manufactured part 108 which allows the manufactured part 108 to be accessed by further manufacturing processes.

The connector 118 may be rigid or flexible, depending on the part material, weight of the manufactured part 108, the part connector 118 thickness, etc. In one embodiment, the part connector 118 is rigid and thick to insure that the manufactured part 108 remains rigidly attached to the carrier 102. In another embodiment, the part connector 118 is flexible and thin to allow the manufactured part 108 to remain flexibly attached to the carrier 102. This may be used to allow the part to move slightly with respect to the carrier 102 when the carrier 102 is received into the take-up apparatus 106. In this embodiment, the carrier 102 substantially maintains orientation of the manufactured part 108 with respect to the portion of the carrier 102 on which the manufactured part 108 is attached while allowing the manufactured part 108 to move slightly for packing or shipping.

In one embodiment, the connector 118 is a single diameter along the entire length of the connector 118. In another embodiment, the diameter of the connector 118 changes along the length of the connector 118. In one embodiment, the part connector 118 is larger in diameter at the attachment point to the carrier 102 than at the attachment point to the manufactured part 108. In another embodiment, the part connector 118 is smaller in diameter at the attachment points to the manufactured part 108 and the carrier 102 than in the middle of the part connector 118. This facilitates easy removal of the manufactured part 108 from the connector 118 and the carrier 102.

In one embodiment, the carrier 102 is wider at a location where a connector 118 of a manufactured part 108 is connected and narrower in other locations, forming a semi-protrusion. For example, if the carrier 102 has a planar cross section, such as a paper strip, the carrier 102 could be cut on one side with a scalloped shape so connectors 118 could be attached to a wider portion of the carrier 102. This may facilitate easier removal of the manufactured part 108, indexing, etc.

The system 100 includes a part forming module 110 used by a manufacturing process to form a manufactured part 108. The part forming module 110 may comprise one machine or may include two or more machines. The part forming module 110 may use an injection molding process, a cast metal process, a stamped metal process, or the like and may form a manufactured part 108 using a mold 114 or dye. For example, in an injection molding process, the part forming module 110 forms a manufactured part 108 by clamping parts of a mold 114 together and injecting hot plastic or another suitable material into the mold 114. The part forming module 110 then opens the mold 114 and the manufactured part 108 comes free of the mold 114 with a connector 118 formed onto the carrier 102 and/or prong 116.

In another example, the part forming module 110 clamps parts of a mold 114 together and injects molten metal to form a manufactured part 108 and connector 118. In yet another example, the part forming module 110 uses some type of a die 114 and stamps metal to form a manufactured part 108. The die 114 may also attach the manufactured part 108 to the carrier 102 or prong 116 of the carrier 102. Other manufacturing methods can be used such as powder metal stamping processes, foam processes, glass forming professes, manual manufacturing processes, rolling processes, open-die forging processes, die forging processes, impact extrusion processes, extrusion processes, drawing processes, rapid prototyping processes, etc.

In one embodiment, the supply apparatus 104 and the take-up apparatus 106 are positioned vertically with respect to the part forming module 110. For example, a supply apparatus 104 may be positioned below the mold 114 of a part forming module 110 and the take-up apparatus 106 may be positioned above the part forming module 110, as depicted in FIG. 1A. In another embodiment, the supply and take-up apparatuses 104, 106 are positioned to the sides of a part forming module 110. In another embodiment, a reel is located above or below a part forming module 110 and another reel is positioned to the side of a part forming module 110.

In one embodiment, a take-up apparatus 106 becomes a supply apparatus 104 for a process or sub-process following the process to form a manufactured part 108. One of skill in the art will recognize other part forming modules 110 capable of forming a manufactured part 108 in conjunction with a system 100 to maintain orientation of a manufactured part 108 during a manufacturing process and other locations of supply and take-up apparatuses 104, 106.

The system 100, in one embodiment, includes a holder assembly 112 that positions the supply apparatus 104 on one side of the part forming module 110 and to position the take-up apparatus 106 on a second side of the part forming module 110. In one embodiment, a supply apparatus 104 is connected to one holder assembly 112 and a take-up apparatus 106 is connected to another holder assembly 112. The holder assembly 112 may position a supply or take-up apparatus 104, 106 on any side of a part forming module 110 including above, below or horizontally to the side. In one embodiment, the holder assembly 112 holds a supply apparatus 104 and a take-up apparatus 106 which are both reels, and allows the reels to spin freely or may be attached to a mechanism that turns the reels.

In one embodiment, the holder assembly 112 positions multiple supply apparatuses 104. In another embodiment, the holder assembly 112 positions multiple take-up apparatuses 106. In yet another embodiment, the holder assembly 112 includes guides, wheels, positioners, and the like to help control a position of a carrier 102 with respect to supply and take-up apparatuses 104, 106 and/or the part forming module 110. Part of a holder assembly 112 may be part of the part forming module 110. One of skill in the art will recognize other forms of holder assemblies 112 to position supply and take-up apparatuses 104, 106 with respect to the part forming module 110.

In one embodiment, the system 100 includes a feeder module to turn the supply and take-up apparatuses 104, 106. In one embodiment, the feeder module feeds the carrier 102 from the supply apparatus 104 into the part forming module 110. In one embodiment, one supply apparatus 104 spins freely and another take-up apparatus 106 is turned by a feeder module. A feeder module may comprise a motor, a cogged drive wheel, a belt, and the like. In one embodiment, the feeder module contains a position sensing mechanism used to position the carrier 102 or prongs 116 with respect to the part forming module 110. The position sensing mechanism may include a rotary encoder.

In one embodiment, the system 100 includes a mold 114. In one embodiment, the mold 114 is part of the part forming module 110 and forms the manufactured part 108. In one embodiment, the mold 114 contains the inverse area of the manufactured part 108 and the inverse area of the connector 118. In one embodiment, the mold 114 includes two portions of the mold 114 which are closed during the manufacturing process. In one embodiment, the carrier 102 is closed within the mold 114 to facilitate connection between the connector 118 and the carrier 102. In one embodiment, a mold 114 is not necessary in the manufacturing process. This is the case in manufacturing processes such as rapid prototyping and many secondary machining processes. In other embodiments, the part forming module 110 includes one or more other manufacturing mechanisms that form or attach a manufactured part 108 and/or connector 118 onto a carrier 102 or prong 116 of a carrier 102.

In the embodiment of FIG. 1A, the connector 118 and the manufactured part 108 are formed as part of an injection molding manufacturing process. A mold 114 is created for the part. The vacant area of the mold 114 is the inverse area of the manufactured part 108 to be created. An extra area is vacated that intersects with the inverse area of the manufactured part 108. This area is the inverse area of the connector 118. When the part is formed, typically the connector 118 protrudes from the manufactured part 108.

The carrier 102 is placed so that at least one prong 116 or a portion of the carrier 102 will be enclosed within the mold 114 when the mold 114 is closed. The prong 116 or carrier 102 is placed in the area of the mold 114 that corresponds to the inverse area of the connector 118. The mold 114 is closed with at least on prong 116 or the carrier 102 closed within the mold 114. When the mold 114 halves touch, pressure is typically applied so that the halves do not separate during the manufacturing process. The material of the part travels into the mold 114 via a sprue bushing which connects to a runner system. The runner system delivers the material to the mold 114 cavity to form the desired part.

The mold 114 fills and the part cools. The mold 114 is then opened and the manufactured part 108 is typically ejected through the use of ejector pins. The manufactured part 108 is connected to the carrier 102 through the connection between the prongs 116 and the connector 118. The carrier 102 then maintains orientation of the part with respect to the area of the carrier 102 on which the manufactured part 108 is formed.

Once the part forming process has been completed, the carrier 102 advances and moves the part away from the part forming module 110. A new portion of the carrier 102 or new prong 116 can then be placed within the part forming module 110 to form another part.

In other embodiments, other manufacturing processes are used to create the manufactured part 108 and to attach the connector 118 to the prongs 116 of the carrier 102. These other manufacturing processes include, but are not limited to, powder metal stamping processes, foam processes, glass forming processes, manual packing process, rolling processes, open-die forging processes, die forging processes, extrusion processes, drawing processes, and rapid prototyping processes.

Beneficially, the system 100 for maintaining orientation of a manufactured part 108 during a manufacturing process overcomes some or all of the deficiencies of the prior art. The system 100 provides a convenient way to maintain orientation of manufactured parts 108 for each stage of a manufacturing process without requiring manual placement by workers or mechanical placement by expensive positioning equipment. The system 100 may be less expensive than other methods and systems for repositioning manufactured parts 108 after initial creation of the manufactured parts 108.

FIG. 1B is a schematic block diagram illustrating a more detailed view of one embodiment of the system 100 for maintaining orientation of a manufactured part 108 during a manufacturing process in accordance with the present invention. Two carriers 102 are located on opposite sides of the manufactured part 108. The carriers 102 contain prongs 116 protruding from the carriers 102 at regular intervals. The prongs 116 connect with the manufactured parts 108 and maintain the orientation of the manufactured parts 108 with respect to the portion of the carriers 102 on which the prongs 116 connect.

FIG. 1C is a schematic block diagram illustrating a more detailed view of one embodiment of the system 100 for maintaining orientation of a manufactured part 108 during a manufacturing process in accordance with the present invention. As in FIG. 1B, the manufactured part's orientation is maintained once the manufactured part 108 is formed by the connection between the manufactured part 108 and the prongs 116.

Figure 2A:
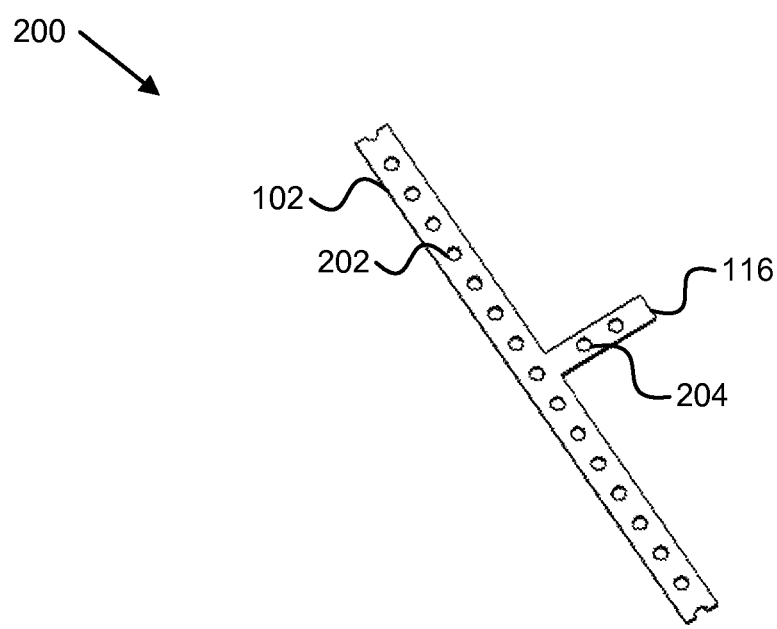
FIG. 2A is a schematic block diagram illustrating a view of a portion of one embodiment of an apparatus for maintaining orientation of a manufactured part during a manufacturing process in accordance with the present invention.
Figure 2B:
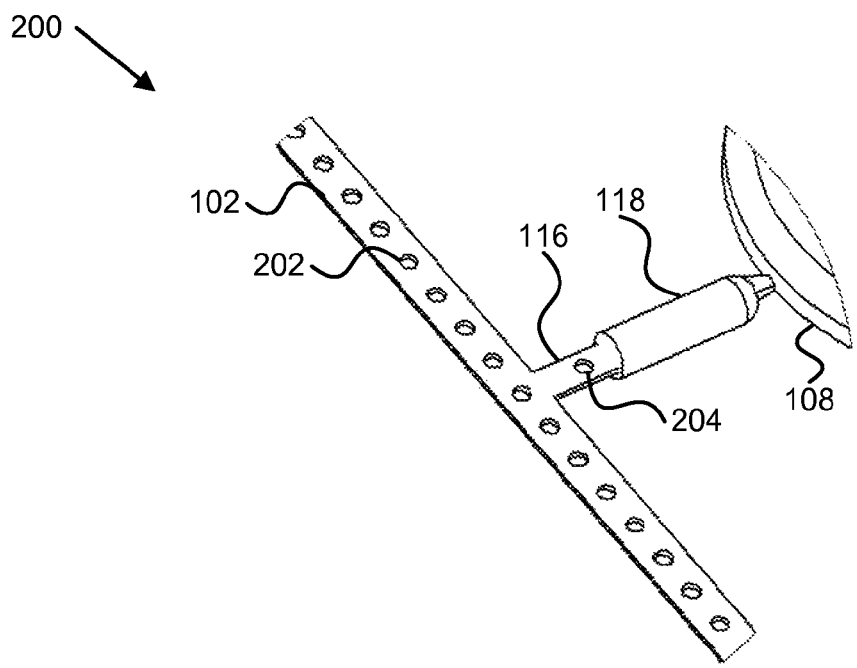
FIG. 2B is a schematic block diagram illustrating another view of a portion of one embodiment of an apparatus for maintaining orientation of a manufactured part during a manufacturing process in accordance with the present invention.

FIGS. 2A and 2B are schematic block diagrams illustrating one embodiment of an apparatus 200 for maintaining orientation of a manufactured part 108 during a manufacturing process in accordance with the present invention. FIGS. 2A and 2B each include a portion of the apparatus 200. The apparatus 200 includes a carrier 102, at least one prong 116 protruding from the carrier 102, a manufactured part 108, and a connector 118, substantially similar to those described in relation to the system 100 described in FIGS. 1A, 1B, and 1C. The apparatus 200, in one embodiment, includes indexing holes 202 and prong holes 204, which are described below.

The apparatus 200 includes an indexing mechanism configured to facilitate advancing the carrier 102 to a predetermined location in the part forming module 110 to form the manufactured part 108 onto at least one prong 116. The indexing mechanism, in one embodiment, includes one or more indexing holes 202 in the carrier 102. The indexing holes 202 may be round, square, rectangular, oblong, or any other shape that facilitates indexing. For example, a round indexing hole 202 may be used by a drive wheel attached to an encoder to determine a position of the carrier 102. A drive wheel may comprise a mechanical wheel of a fixed diameter and with cogs or other protrusions extending from the wheel to engage the indexing holes 202 of the carrier 102. A shaft may be attached to the wheel. An encoder or another sensor determines angular rotation of the drive wheel. An advancing mechanism may be tied to the encoder or sensor.

As the advancing mechanism advances the carrier 102 into the part forming module 110, the carrier 102 causes the drive wheel to turn and when the sensor determines that the carrier 102 has advanced to the predetermined location in the part forming module 110, the advancing mechanism stops the carrier 102 to allow the part forming module 110 to form a manufactured part 108 onto prongs 116 of the carrier 102. After the manufactured part 108 is completed, the part forming module 110 advances the carrier 102 so that one or more additional prongs 116 are moved to the pre-determined location in the part forming module 110. Indexing holes 202 of different shapes may be included on the same carrier 102. For example, rectangular holes may be used by a cog or other device to advance the carrier 102 while round holes may be used by a drive wheel. One of skill in the art will recognize other indexing mechanisms and other indexing holes 202 to control advancement of the carrier 102 into the part forming module 110.

The apparatus 200, in another embodiment, includes prong holes 204 in the prongs 116. Prong holes 204, in one embodiment, may be used as indexing holes 202. In another embodiment, prong holes 204 may be used to secure a manufactured part 108 to a prong 116. For example a connector 118 formed around a prong 116 with a prong hole 204 may be more secure than a connector 118 formed around a prong 116 without a prong hole 204. In another example, a manufactured part 108, formed using a stamped metal or other process, may push a metal prong through the prong hole 204. One of skill in the art will recognize other uses for a prong hole 204 in a prong 116 protruding from a carrier 102.

In another embodiment, the position of the carrier 102 is determined by an encoder placed on the take-up apparatus 106. In another embodiment, the position of a manufactured part 108 that is connected to the carrier 102 is determined by contact. The part forming module 110 does not begin operation until the manufacture part contacts a portion of the part forming module 110. In another embodiment, the part contacts a position control sensor that precisely measures the position of the manufactured part 108. The part may be physically contacted from a plurality of angles to insure that the part is correctly positioned.

In one embodiment, the carrier 102 contains indexing marks. A reader reads the indexing marks on the carrier 102 to position the carrier 102. The indexing marks may be magnetic imprints, printed marks, bumps, holes, bar codes or the like. In one embodiment, the carrier 102 contains a bar code printed on a portion of the carrier 102 opposite the position for each manufactured part 108. When the bar code is sensed by a bar code scanner, the manufacturing process proceeds to create the manufactured part 108 at that location on the carrier 102. Bar codes are placed on the carrier 102 according to the desired position of the manufactured parts 108.

In another embodiment, the carrier 102 contains bumps along one side of the carrier 102. The bumps are counted by the part forming module 110 to ascertain the position of the carrier 102 with respect to the part forming module 110. In another embodiment, the carrier 102 contains bumps along both sides of the carrier 102.

In another embodiment, the carrier 102 contains protrusions on the side of the carrier 102 which are counted by the part forming module 110 to ascertain the position of the carrier 102 with respect to the part forming module 110. In another embodiment, the carrier 102 contains protrusions along both sides of the carrier 102. In another embodiment, an indicator protrusion is placed to notify the part forming module 110 of a position on which a manufactured part 108 is to be placed.

Figure 3:
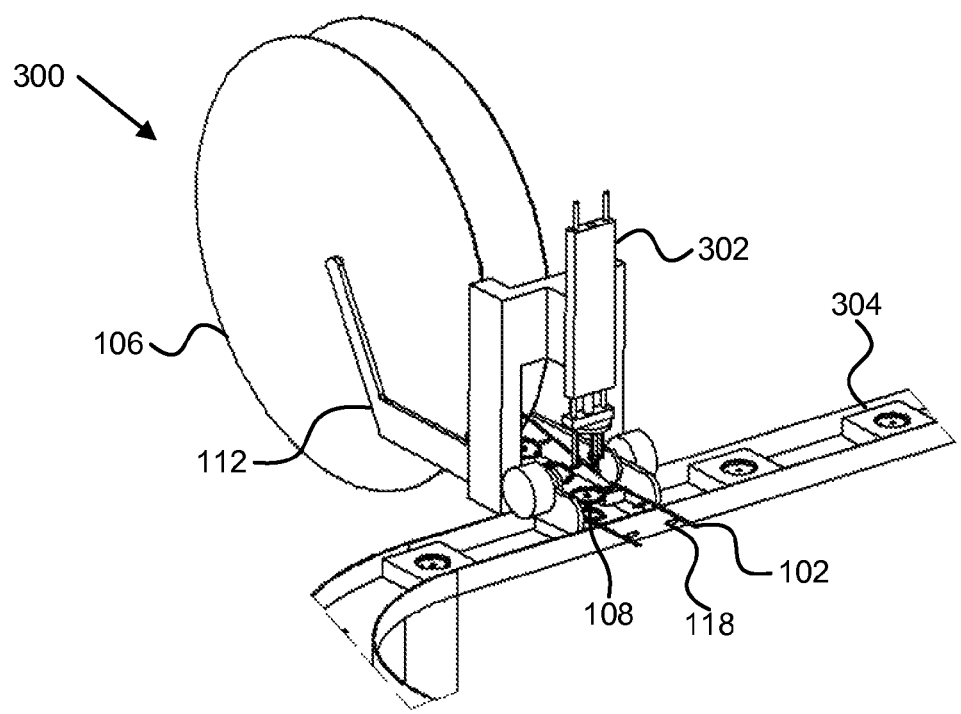
FIG. 3 is a schematic block diagram illustrating an embodiment of an apparatus for maintaining orientation of a manufactured part during a manufacturing process in a trimming and placing process in accordance with the present invention.

FIG. 3 is a schematic block diagram illustrating an embodiment of an apparatus 300 for maintaining orientation of a manufactured part 108 during a manufacturing process in a trimming process in accordance with the present invention. The apparatus 300 includes a carrier 102, a take-up apparatus 106, a holder assembly 112, prongs 116 (not shown), a manufactured part 108, and connectors 118, substantially as described in relation to FIGS. 1A, 1B, 1C, 2A, and 2B. The apparatus 300 also includes a trimming and placement assembly 302 and, in one embodiment, a trimming and placement assembly 302 may be attached to some sort of conveyer assembly 304, which are described below. The conveyor assembly 304 may also be an indexing turn-table or other apparatus to transport parts from station to station.

The apparatus 300, in one embodiment, includes a trimming and placement assembly 302 that trims manufactured parts 108 from a carrier 102. For example, a take-up apparatus 106 with a coiled carrier 102 with attached manufactured parts 108 may be loaded onto a holder assembly 112 and the carrier 102 fed into a trimming and placement assembly 302. The trimming and placement assembly 302 may include an indexing mechanism. As manufactured parts 108 are fed into the trimming and placement assembly 302, the trimming and placement assembly 302 may trim manufactured parts 108 from the carrier 102, from prongs 116 or the carrier 102, connectors 118, etc. In one embodiment, the trimming and placement assembly 302 allows the trimmed manufactured parts 108 to fall into a bin after trimming. In another embodiment, the trimming and placement assembly 302 places manufactured parts 108 into a packaging assembly to package the manufactured parts 108 by allowing them to fall into a package or by mechanically placing the manufactured parts 108 in a package.

In another embodiment, the trimming and placement assembly 302 trims the manufactured parts 108 from the carrier 102, prongs 116 (where applicable), and connectors 118 and places the manufactured parts 108 on a conveyer assembly 304. The trimming and placement assembly 302 may place the manufactured part 108 by allowing the parts 108 to fall or by mechanically moving the part 108 to the conveyer assembly 304. The conveyer assembly 304 may include an assemblies of other parts, sub-assemblies, etc. so that the trimming and placement assembly 302 places the manufactured parts 108 onto the assemblies, sub-assemblies, etc. in a correct orientation as part of an assembly line. Beneficially, the apparatus 300 and system 100 allow placement of a manufactured part 108 correctly onto a conveyer assembly 304 while maintaining orientation of the manufactured part 108.

In one embodiment, the trimming and placement assembly 302 trims the manufactured part 108 from the carrier 102 by severing the part connectors 118. In one embodiment, the part connectors 118 are severed near the body of the part. In another embodiment, the part connectors 118 are not severed near the body of the part. In one embodiment, a portion of the part connectors 118 remains attached to the manufactured part 108.

FIG. 4 is a schematic block diagram illustrating an embodiment of an apparatus 400 for maintaining orientation of a manufactured part 108 during a manufacturing process in a second processing step in accordance with the present invention. The apparatus 400 includes a carrier 102, at least one take-up apparatus 106, a holder assembly 112, prongs 116 (not shown), a manufactured part 108, and connectors 118

(not shown), substantially as described in relation to FIGS. 1A, 1B, 1C, 2A, and 2B. The apparatus 400 also includes a second part forming module 402 for further processing of the manufactured part 108. The further processing may be a silk screening process, a painting process, a plating process, an assembly process, a machining process, or any other processing step suitable for a carrier 102 with attached manufactured parts 108. The further processing may include several processing steps and machines.

The second part forming module 402 may include an indexing mechanism and may advance the carrier 102 with attached manufactured parts 108 into the second part forming module 402 in much the same way that the part forming module 110 advances the carrier 102 to form manufactured parts 108. Beneficially, a carrier 102 with attached manufactured parts 108 allows a second part forming module 402 to silk screen a logo onto a manufactured part 108, paint or plate a particular section of a manufactured part 108, place the manufactured part 108 into an assembly, and the like without having to reorient the manufactured part 108 at each processing step.

In one embodiment, the carrier 102 moves so that the part is in the proper position for a part forming process. Once the part is formed, the carrier 102 is moved so that the part is positioned for a further manufacturing process. The carrier 102 stops again so that the second manufacturing process can be completed. This process can be repeated from a plurality of manufacturing processes on a single part. The manufacturing processes and forming machines may be spaced so that they can be performed simultaneously on different parts on the same carrier 102.

In one embodiment, a precision part is formed out of tolerance in a casting process and then machined into tolerance in a second machining process. There may be several machining process during which the orientation of the manufactured part 108 must be maintained. In the case of an engine block, transmission, or medical device, precision tolerancing may be met through a series of manufacturing steps including drilling, milling, threading, surface grinding, internal grinding, etc. During each step, the orientation of the part is maintained due to the connection between the part and the carrier 102.

In one embodiment, the process of forming the initial manufactured part 108 may involve several steps. In one embodiment, a ceramic part is first formed onto the carrier 102 in a molding process. The ceramic is then machined to general tolerances in a second manufacturing process. The ceramic is then heated and cured during a third manufacturing process. The ceramic is then machined to tight tolerance in a plurality of manufacturing processes. The manufactured part 108 and carrier 102 may move continuously from one manufacturing process directly to the next or may be stored and shipped between processes.

Figure 5:
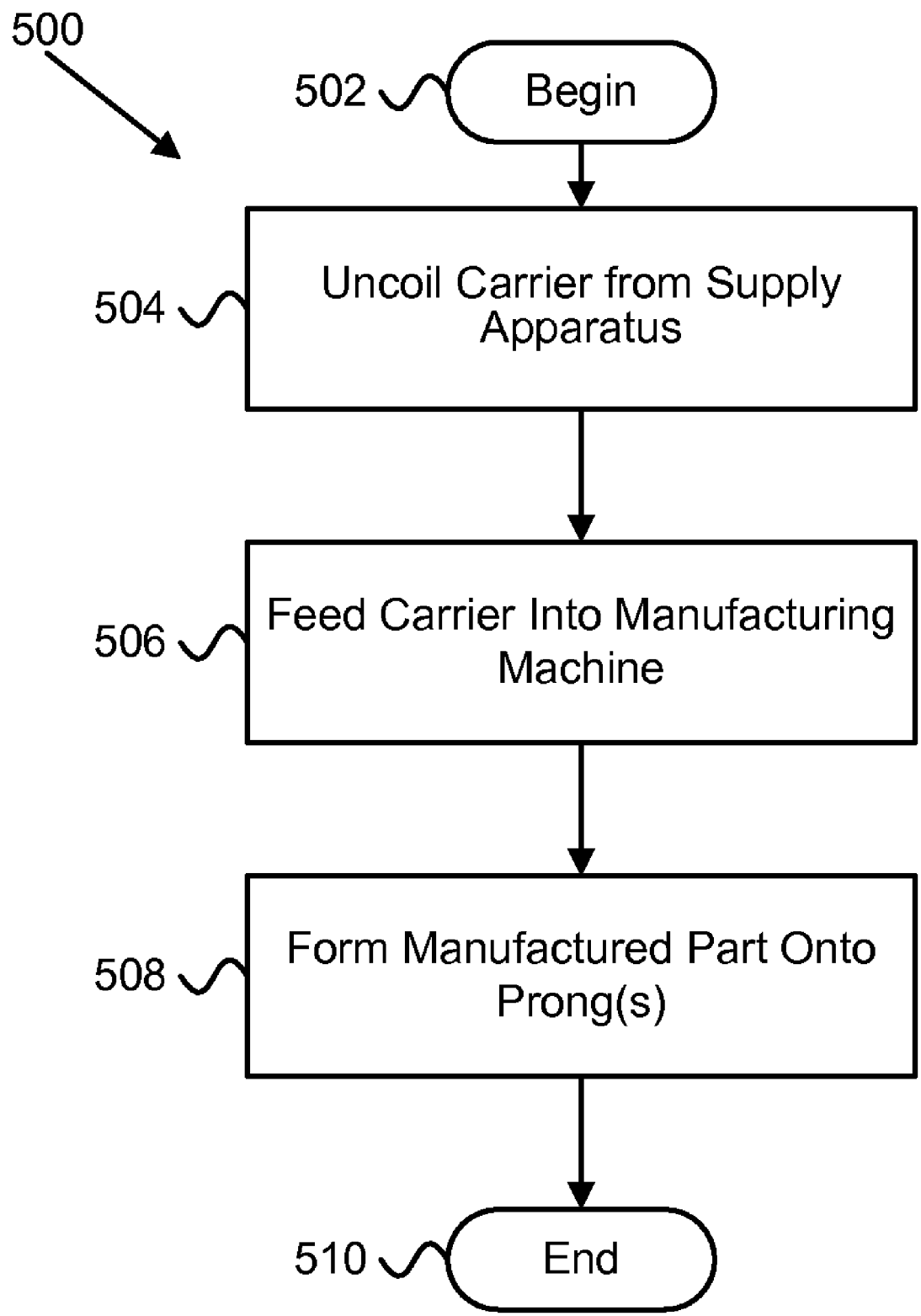
FIG. 5 is a schematic flow chart diagram illustrating one embodiment of a method for maintaining orientation of a manufactured part during a manufacturing process in accordance with the present invention.

FIG. 5 is a schematic flow chart diagram illustrating one embodiment of a method 500 for maintaining orientation of a manufactured part 108 during a manufacturing process in accordance with the present invention. The method 500 begins 502 and the part forming module 110 uncoils 504 the carrier 102 from at least one supply apparatus 104. In one embodiment, the part forming module 110 uses an indexing mechanism to advance the carrier 102 and to uncoil 504 the carrier 102 from one or more supply apparatuses 104. The part forming module 110 feeds 506 the carrier 102 into the part forming module 110 to form a manufactured part 108. The part forming module 110 forms 508 the manufactured part 108 onto at least one prong 116 protruding from the carrier 102 and the method 500 ends 510. The one or more prongs 116 attached to the manufactured part 108 maintain orientation of the manufactured part 108 with respect to the carrier 102. In another embodiment, the system 100 for maintaining orientation of a manufactured part 108 uncoils 504 the carrier 102 or feeds 506 the carrier 102 into the part forming module 110.

Figure 6:
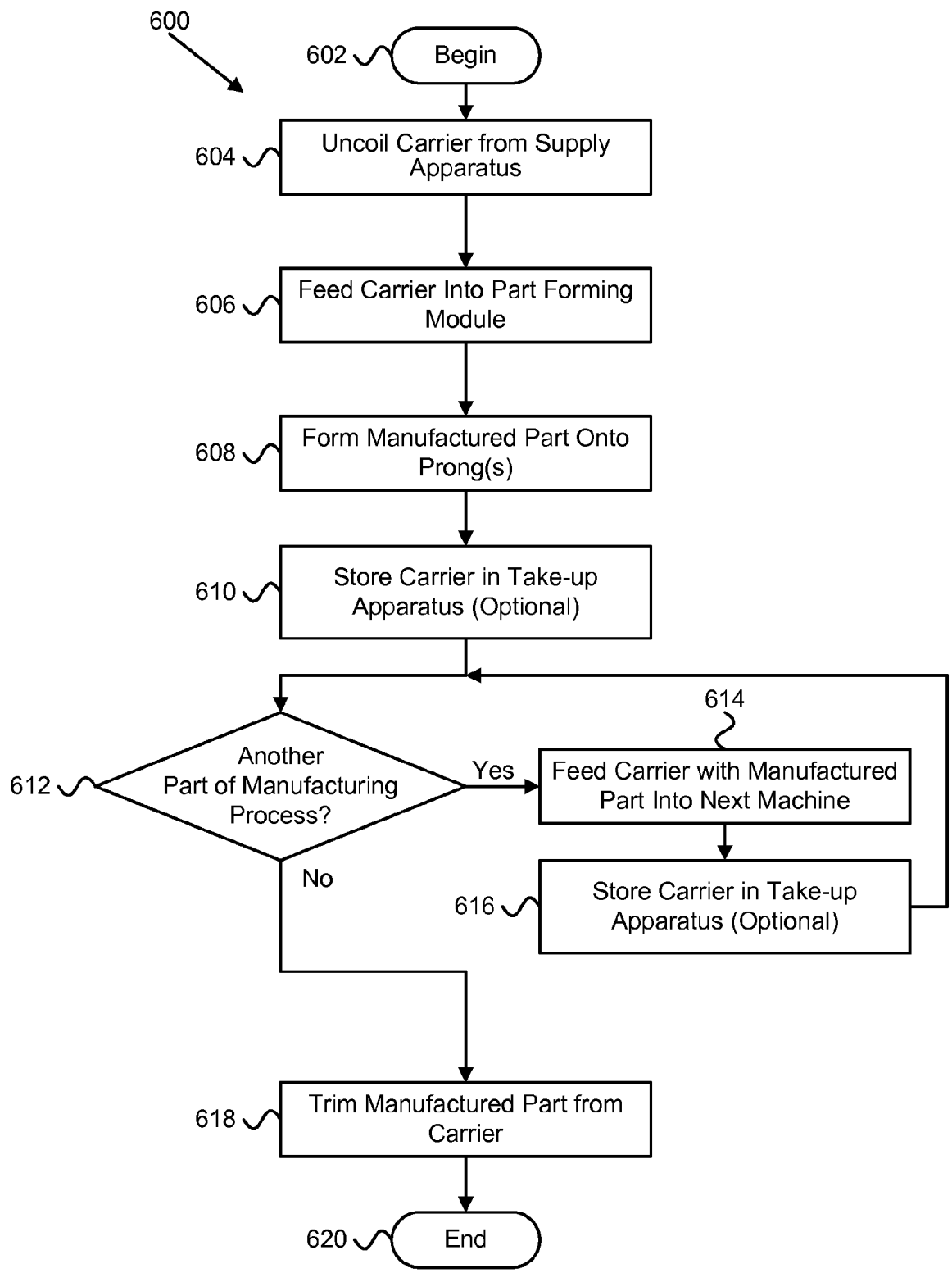
FIG. 6 is a schematic flow chart diagram illustrating another embodiment of a method for maintaining orientation of a manufactured part during a manufacturing process in accordance with the present invention.

FIG. 6 is a schematic flow chart diagram illustrating another embodiment of a method 600 for maintaining orientation of a manufactured part 108 during a manufacturing process in accordance with the present invention. The method 600 begins 602 and the part forming module 110 uncoils 604 the carrier 102 from at least one supply apparatus reel 104. In one embodiment, the part forming module 110 uses an indexing mechanism to advance the carrier 102 and to uncoil 604 the carrier 102 from one or more supply apparatuses 104. The supply apparatus 104 feeds 606 the carrier 102 into the part forming module 110 to form a manufactured part 108. The part forming module 110 forms 608 the manufactured part 108 onto at least one prong 116 protruding from the carrier 102. The one or more prongs 116 attached to the manufactured part 108 maintain orientation of the manufactured part 108 with respect to the carrier 102. Optionally, the part forming module 110 coils 610 the carrier 102 with attached manufactured parts 108 onto a take-up apparatus 106.

If the method 600 determines 612 there is another step of the manufacturing process, a second part forming module 402 feeds 614 the carrier 102 with attached manufactured parts 108 into another part forming module 402 for processing. Optionally, the part forming module 402 coils 616 the carrier 102 with attached manufactured parts 108 onto a take-up apparatus 106 and the method 600 returns to determine 612 if there is another manufacturing process. In one embodiment, the part forming module 110 feeds 614 the carrier 102 with attached manufactured parts 108 from one part forming module 110, 402 to the next without coiling the carrier 102 onto a take-up apparatus 106. If the method 600 determines 612 there are no more manufacturing processes, the trimming and placement assembly 302 trims 618 the manufactured parts 108 from the carrier 102 and the method 600 ends 620. The trimming and placement assembly 302 may allow manufactured parts 108 into a bin, place manufactured parts 108 onto a conveyer assembly 304, and the like.

Figure 7:
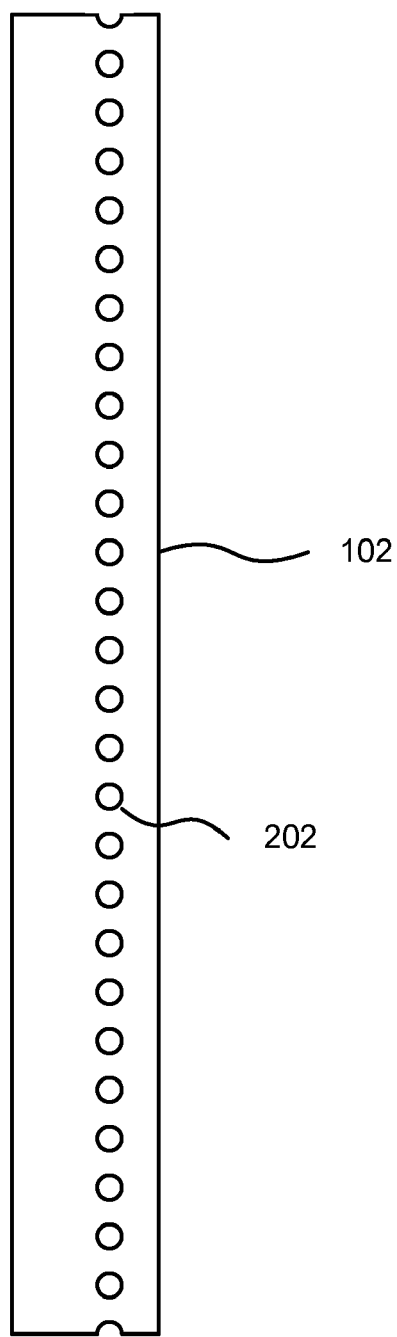
FIG. 7 is a schematic block diagram illustrating one embodiment of a carrier for maintaining orientation of a manufactured part during a manufacturing process in accordance with the present invention.

FIG. 7 shows a schematic block diagram illustrating a carrier 102 for maintaining orientation of a manufactured part 108 during a manufacturing process. The carrier 102 contains indexing holes 202 to orient the carrier 102 with respect to the part forming module 110. The carrier 102 does not contain prongs 116 onto which the connector 118 is formed but rather the connector 118 forms directly onto the carrier 102. The connector 118 may form around the entire carrier 102 or may form on to only part of the carrier 102. The connector 118 may form onto the carrier 102 during a manufacturing process which forms the manufactured part 108 or may form onto the carrier 102 during a separate manufacturing process from that which forms the manufactured part 108. The carrier 102 may be texturized to increase adhesion between the connector 118 and the carrier 102.

Figure 8A:
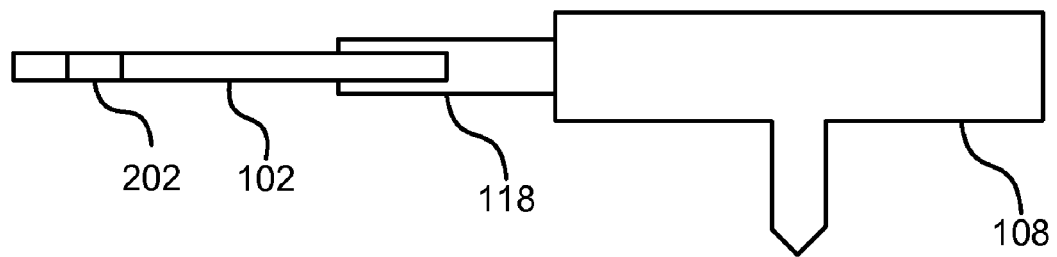
FIG. 8A is a schematic block diagram illustrating a crosscut view of a carrier, a connector, and a manufactured part in accordance with the present invention.
Figure 8B:
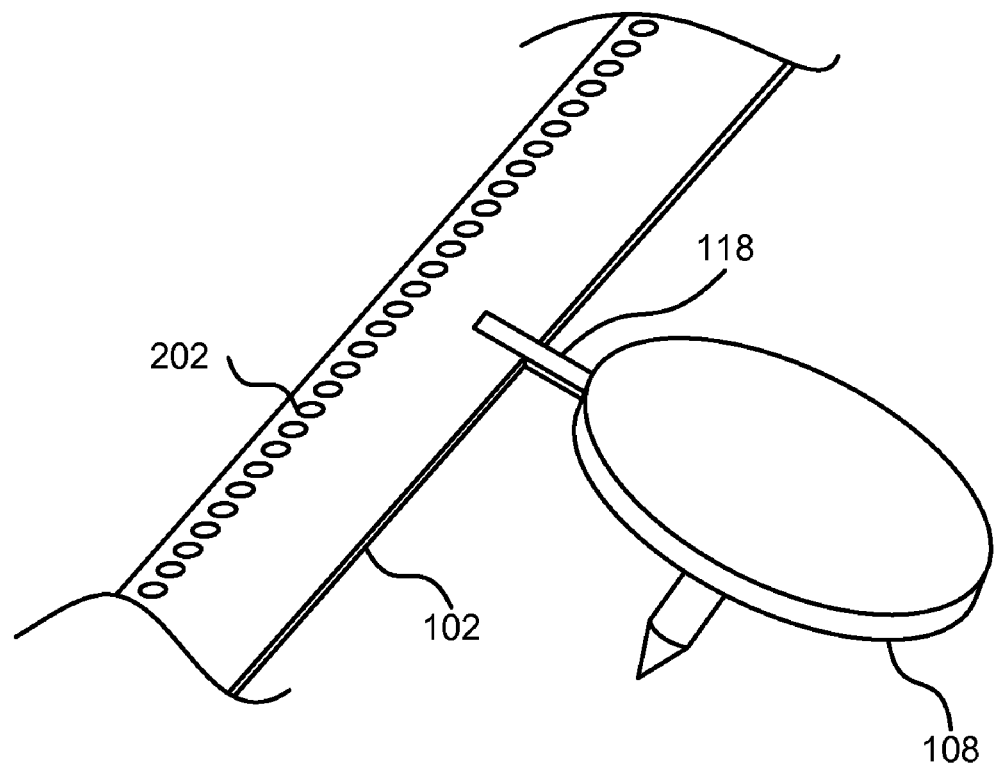
FIG. 8B is a schematic block diagram illustrating a perspective view of a carrier, a connector, and a manufactured part in accordance with the present invention.

FIG. 8A and FIG. 8B show a schematic block diagram illustrating a cross-cut view and a perspective view of a carrier 102, a connector 118, and a manufactured part 108 in accordance with the present invention. The manufactured part 108 is formed directly onto the carrier 102 through the use of a connector 118. The connector 118 maintains orientation of the manufactured part 108 with respect to the portion of the carrier 102 on which the manufactured part 108 is attached.

The connector 118 may form on a plurality of sections of the carrier 102. In one embodiment, as depicted in FIG. 8A, the connector 118 forms onto two sides of the carrier 102. The connector 118 forms on a top side and a bottom side of the carrier 102 to secure the connector 118 to the carrier 102. In another embodiment, the carrier 102 forms only on one side of the carrier 102. In one embodiment, a manufactured part 108 contains a plurality of connectors 118 that form on the carrier 102 according to their placement on the manufactured part 108. In another embodiment, a manufactured part 108 has a plurality of connectors 118 that attach to the carrier 102.

In one embodiment, the carrier 102 includes through holes situated at regular intervals along the longitudinal axis of the carrier 102. In this embodiment, the connector 118 material forms onto a top side and a bottom side of the carrier 102 and the connector 118 material connects to itself through the through hole.

The number of connectors 118 extending from a manufactured part 108 is typically dictated by the weight of the object, the shape of the object, cost of production, post-forming manufacturing processes, manufacturing part aesthetics and several other considerations. In one embodiment, each part is connected to the carrier 102 through the use of a single connector 118. In another embodiment, each manufactured part 108 is connected to the carrier 102 through the use of several carriers 102.

In another embodiment, two carriers 102 are attached to two connectors 118 extending from the manufactured part 108. In another embodiment, a plurality of carriers 102 is attached to a plurality of connectors 118 extending from the manufactured part 108. In one embodiment, a carrier 102 is situated over the manufactured part 108 and a carrier 102 is situated below the manufactured part 108. A connector 118 connects the manufactured part 108 to the carrier 102 situated over the manufactured part 108 and another connector 118 connects the manufactured part 108 to the carrier 102 situated under the manufactured part 108.

The manufactured part 108 may be supported in one or more dimensions. In one embodiment, the manufactured part 108 is supported on two lateral sides by two carriers 102. In another embodiment, the manufactured part 108 is supported in three dimensions by three carriers 102. In another embodiment, a top carrier 102 feeds from a first supply apparatus 104 and a bottom carrier 102 feeds from a second supply apparatus 104. The top carrier 102 attaches to the top of the manufactured part 108 while the bottom carrier 102 attaches to the bottom of the manufactured part 108. In another embodiment, the top and bottom carriers 102 uncoil from the same supply apparatus 104 and attach to the manufactured part 108.

Residue material may be left on the carrier 102 after a part forming process. In one embodiment, the carrier 102 is cleaned of any residue of the manufactured part 108 through the use of a chemical bath. The chemical bath dissolves the residue material from the carrier 102 while preserving the structural integrity of the carrier 102. In another embodiment, residue from the manufactured part 108 is removed from the carrier 102 manually. In another embodiment, residue from the manufactured part 108 remains on the carrier 102 when the carrier 102 is reused.

In one embodiment, a powder metal forming process is used to construct the manufactured part 108. A mold 114 is created in the inverse shape of the desired manufactured part 108. The inverse area of at least one connector 118 is created as part of the mold 114. Powder metal is collected within the mold 114 and the mold 114 is heated. The carrier 102 is placed between the two sections of the mold 114. The placement of the carrier 102 may be done manually or automatically. The mold 114 is closed and pressure is applied to the mold 114 as the mold 114 is heated. The particles of the powder metal are heated to a temperature just above their melting point and the particles form together. Once the particles are cooled and the part solidifies, the mold 114 is opened. The part is ejected from the mold 114. The part is connected to the carrier 102 through the connection between the connector 118 and the carrier 102.

In another embodiment, a rapid prototyping process is used to construct the manufactured part 108. In one embodiment, the rapid prototyping process is fused-deposition modeling. The carrier 102 is placed within the rapid prototyping machine in an area directly adjacent to the area that will contain the manufactured part 108. The part is formed as a gantry-robot moves over a table of the rapid prototyping machine. The gantry-robot arm moves a heated die over the table. A thermoplastic or wax filament is extruded through a small orifice of the heated die. The part is formed as layers of thermoplastic or wax are extruded layer upon layer. As the layers build upon each other, the part is formed.

The part is often formed from a CAD drawing of the part. In addition to the desired part, a connector 118 is included a CAD plan for the manufactured part 108. The carrier 102 is placed in the area containing the connector 118 and is attached to the part as the thermoplastic or wax is formed onto the carrier 102. When the part is completed, the carrier 102 can be moved with the manufactured part 108 attached. Another section of the carrier 102 can then be moved under the rapid prototyping machine and the manufacturing process can repeat. This attaches another manufactured part 108 to another portion of the carrier 102.

Figure 9:
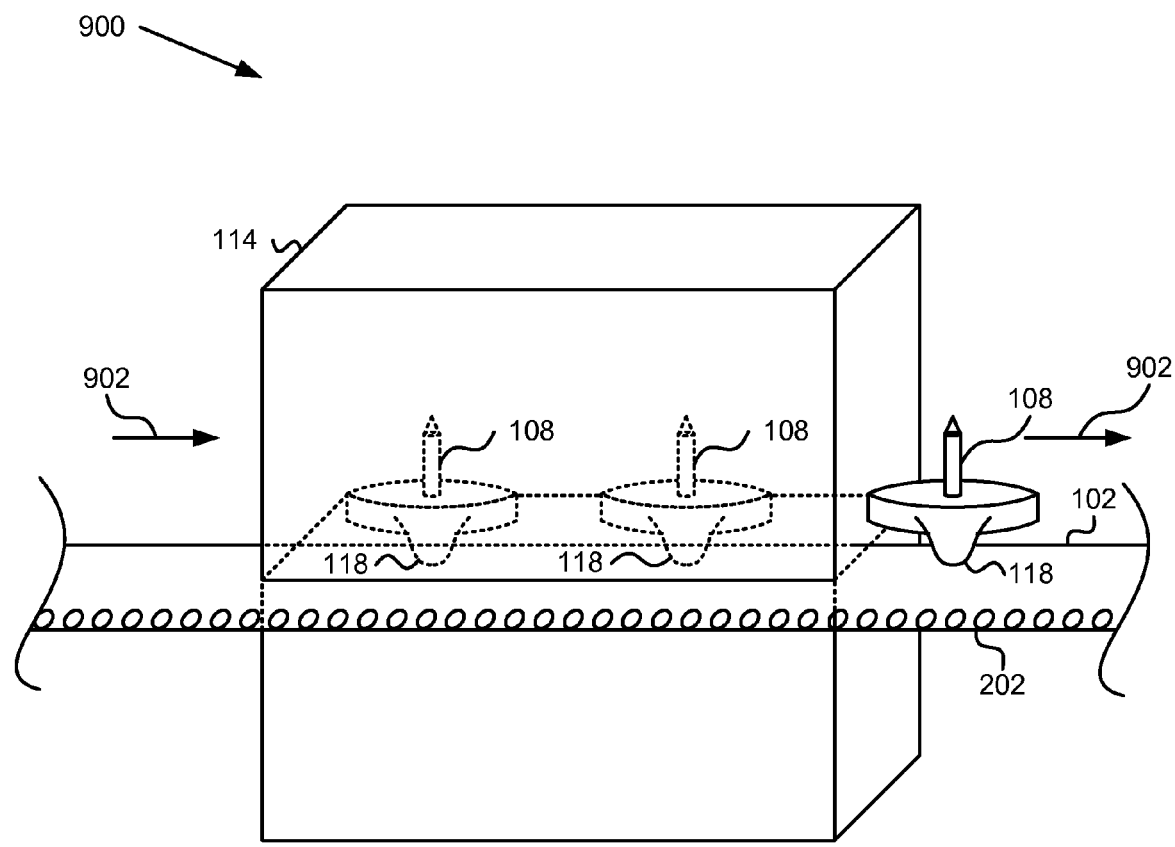
FIG. 9 is a schematic block diagram illustrating an embodiment of a portion of an apparatus for maintaining orientation of a manufactured part during a manufacturing process in accordance with the present invention.

FIG. 9 shows a schematic block diagram illustrating an embodiment of an apparatus 900 for maintaining orientation of a manufactured part 108 during a manufacturing process. The mold 114 closes on at least a portion of the carrier 102 before forming the manufactured part 108. Two manufactured parts 108 are formed during a single part forming process. The material of the manufactured part 108 enters the mold 114 through a carrier 102. Once the manufactured parts 108 are formed, the carrier 102 and newly formed manufactured parts 108 move in a direction 902.

In the embodiment of FIG. 9, the manufactured part 108 may be formed by injection molding. A mold 114 is created for the part. In the embodiment of FIG. 9, two manufactured parts 108 are formed in a single part forming process. The vacant area of the mold 114 is the inverse area of the manufactured parts 108 to be created. An extra area is vacated that intersects with the inverse area of the manufactured parts 108. This area is the inverse area of the connector 118. When the part is formed, the connector 118 will typically protrude from the manufactured part 108.

The injection molding process is similar to that explained above except that the carrier 102 itself is placed between the two halves of the mold 114. When the two halves of the mold 114 are connected, the carrier 102 is pressed between the two halves. A portion of the carrier 102 is within the cavity of the mold 114. The carrier 102 is within a portion of the cavity that comprises at least one connector 118. When the plastic is inserted into the mold 114, it fills the area within the cavity, including the area reserved for the connector 118. The plastic fills the area around the carrier 102. When the plastic cools, it solidifies to the carrier 102. When the mold 114 is opened, the manufactured parts 108 are attached to the carrier 102 through the connector 118 that is formed onto the carrier 102. The carrier 102 is then moved in a direction 902 so that a different area of the carrier 102 can be placed within the mold 114.

In other embodiments, other manufacturing processes are used to connect the connector 118 directly to the carrier 102.

These include foam processes, glass forming processes, manual packing processes, Rolling processes, Open-die forging processes, Die forging processes, Impact extrusion processes, etc.

Figure 10:
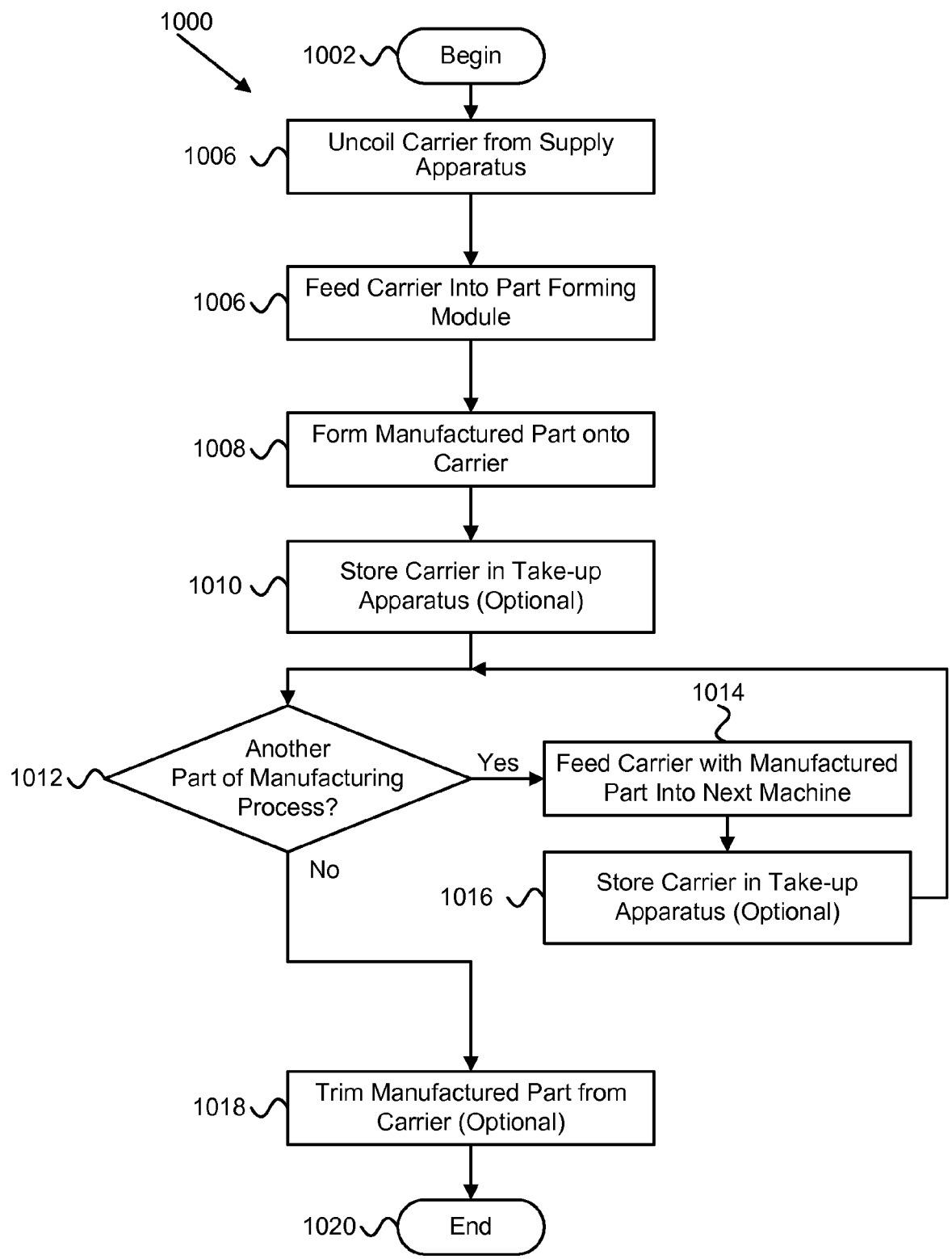
FIG. 10 is a flow chart diagram illustrating another embodiment of a method for maintaining orientation of a manufactured part during a manufacturing process in accordance with the present invention.

FIG. 10 is a schematic flow chart diagram illustrating another embodiment of a method 1000 for maintaining orientation of a manufactured part 108 during a manufacturing process in accordance with the present invention. The method 1000 begins 1002 and the part forming module 110 uncoils 1004 the carrier 102 from at least one supply apparatus 104. In one embodiment, the part forming module 110 uses an indexing mechanism to advance the carrier 102 and to retrieve 1004 the carrier 102 from one or more supply apparatuses 104. The supply apparatus 104 may be a supply reel, a supply spindle, a supply spool, a supply container, or a supply coiling apparatus.

In one embodiment, the supply apparatus 104 is a supply reel and the carrier 102 is coiled onto the supply reel. In another embodiment, the supply apparatus 104 is a container which houses the carrier 102. In another embodiment, the supply apparatus 104 is a coiling apparatus which stores the carrier 102 by coiling the apparatus. The coiling apparatus is a shape other than a reel, such as a cone shaped supply apparatus 104.

The part forming module 110 feeds 1006 the carrier 102 into the part forming module 110 to form a manufactured part 108. The part forming module 110 forms 1008 the manufactured part 108 directly onto the carrier 102 through the use of at least one connector 118. The one or more connectors 118 attach directly to the carrier 102 to maintain orientation of the manufactured part 108 with respect to the carrier 102. Optionally, the system 100 retrieves 1010 the carrier 102 with attached manufactured parts 108 onto a take-up apparatus 106. The take-up apparatus 106 may coil, fold, cut or simple place the carrier 102 into an apparatus for shipping or selling the manufactured parts 108.

If the method 1000 determines 1012 there is another step of the manufacturing process, a second part forming module 402 feeds 1014 the carrier 102 with attached manufactured parts 108 into another part forming module 402 for processing. Optionally, the part forming module 110 places 1016 the carrier 102 with attached manufactured parts 108 onto a take-up apparatus 106 and the method 1000 returns to determine 1012 if there is another manufacturing process. In one embodiment, the part forming module 110 feeds 1014 the carrier 102 with attached manufactured parts 108 from one part forming module 110, 402 to the next without placing the carrier 102 onto a take-up apparatus 106.

If the method 1000 determines 1012 there are no more manufacturing processes, in one embodiment, the trimming and placement assembly 302 trims 1018 the manufactured parts 108 from the carrier 102 and the method 1000 ends 1020. In another embodiment, the system 100 retrieves 1010 the carrier 102 with attached manufactured parts 108 onto a take-up apparatus 106 and the method 1000 ends 1020. The trimming and placement assembly 302 may place manufactured parts 108 into a bin, place manufactured parts 108 onto a conveyer assembly 304, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for maintaining orientation of a manufactured part during a manufacturing process, the method comprising:

feeding, using a feeder module, a carrier from at least one supply apparatus, the carrier comprising a flexible material, the carrier configured to support a plurality of manufactured parts, the carrier formed independent of the plurality of manufactured parts, the supply apparatus storing the carrier such that the carrier may be fed from the supply apparatus, the carrier comprising a plurality of indexing marks;

feeding, using the feeder module, the carrier into a part forming module, the part forming module used by a manufacturing process to form a manufactured part, the manufactured part comprising at least a portion of a finished manufactured part, the carrier being disconnected from any portion of the manufactured part prior to being fed into the part forming module; and determining a position of the carrier in the part forming module in response to sensing the indexing marks on the carrier, wherein the part forming module forms a plurality of manufactured parts and one or more connectors extending between each manufactured part and the carrier such that an edge of each manufactured part to which the carrier is connected is held away from the carrier by the one or more connectors, a width of a portion of the connector formed onto the carrier being equal to or less than a width of the connector at a connection point to the carrier, the widths of the connector measured in a direction the carrier is being fed into the part forming module, the carrier being external to the manufactured parts, the carrier comprising the indexing marks prior to being fed into the part forming module, the one or more connectors formed onto the carrier as the carrier is fed into the part forming module such that raw material used to form the plurality of manufactured parts is used to form the one or more connectors extending from each manufacture part and onto the carrier, wherein the carrier is of sufficient length such that the plurality of manufactured parts may be formed and connected by the one or more connectors to the carrier in a plurality of part forming steps and wherein each manufactured part is connected to the carrier via the one or more connectors such that each manufactured part maintains orientation with respect to the portion of the carrier adjacent to where the manufactured part is connected and each manufactured part maintains the orientation during an operation subsequent to forming the manufactured part.

2. The method of claim 1, wherein the manufactured part is formed onto at least one prong protruding from the carrier, the at least one prong and the carrier configured to maintain orientation of the manufactured part with respect to the portion of the carrier where the manufactured part is formed.

3. The method of claim 1, further comprising gathering the carrier and the manufactured parts formed onto the carrier onto a take-up apparatus, the take-up apparatus accommodates the carrier and the manufactured parts formed onto the carrier while maintaining orientation of each manufactured part with respect to the portion of the carrier where the manufactured part was formed.

4. The method of claim 1, wherein the supply apparatus comprises one of a supply reel, a supply spindle, a supply spool, a supply container, and a supply coiling apparatus, the supply reel storing the carrier coiled onto the supply reel, the supply container housing the carrier, the supply coiling apparatus storing the carrier coiled around the coiling apparatus and the supply coiling apparatus comprising a shape other than that of a reel.

5. The method of claim 3, wherein the take-up apparatus comprises one of a take-up reel, a take-up spindle, a take-up spool, a take-up container, and a take-up coiling apparatus, the take-up reel storing the carrier and each manufactured part coiled onto the take-up reel, the take-up container housing the carrier and each manufactured part, the take-up coiling apparatus storing the carrier and each manufactured part coiled around the coiling apparatus and the take-up coiling apparatus comprising a shape other than that of a reel, wherein each manufactured part maintains orientation with respect to the portion of the carrier where each manufactured part was formed while residing on the take-up reel, in the take-up container, and on the take-up coiling apparatus.

6. The method of claim 1, wherein at least a portion of the manufacturing process comprises an injection molding process.

7. The method of claim 1, wherein at least a portion of the manufacturing process comprises a cast metal process.

8. The method of claim 1, wherein the carrier comprises two or more carriers and the manufactured part is formed onto the two or more carriers.

9. The method of claim 8, wherein the two or more carriers uncoil from two or more supply apparatuses.

10. The method of claim 8, wherein the two or more carriers uncoil from one supply apparatus.

11. The method of claim 1, wherein the carrier comprises a substantially rectangular cross section with a width and a height, the cross section being perpendicular to a direction the carrier is fed into the part forming module, the width substantially larger than the height such that the carrier is substantially planar.

12. The method of claim 1, wherein the indexing marks comprise one or more indexing holes in the carrier and the indexing holes are used by a drive wheel to advance the carrier.

13. The method of claim 1, further comprising uncoiling the carrier and the manufactured part formed onto the carrier into a second part forming module for further processing of the manufactured part.

14. The method of claim 13, wherein the further processing comprises any of a silk screening process, a painting process, a plating process, a machining process and an assembly process.

15. The method of claim 1, further comprising uncoiling the carrier and the manufactured part formed onto the carrier into a trimming and placement assembly that trims the manufactured part from the carrier and places the manufactured part.

16. The method of claim 1, wherein the connector is flexible, and wherein the orientation of the manufactured part is substantially maintained with respect to the portion of the carrier adjacent to where the manufactured part is connected while allowing the manufactured part to move slightly.

17. The method of claim 1, wherein the one or more connectors comprise a narrow piece of material extending between the manufactured part and the carrier, the narrow piece of material comprising a width substantially smaller than a width of a side of the manufactured part to which the narrow piece of material connects.

18. The method of claim 1, wherein the one or more connectors comprise a narrow piece of material extending between the manufactured part and the carrier, the narrow piece of material comprises a cross-sectional area substantially smaller than a cross sectional area of the manufactured part to which the narrow piece of material connects.

19. The method of claim 1, wherein the one or more connectors comprise one of a circular and I-beam cross-sectional shape.

20. The method of claim 1, wherein the one or more connectors extending between each manufactured part and the carrier comprises a plurality of connectors.

21. The method of claim 1, wherein the one or more connectors comprise a smaller cross-sectional area near an attachment point to the manufactured part than at a point further away from the manufactured part.

22. The method of claim 1, wherein the indexing marks comprise one or more of a magnetic imprint, a printed mark, a bump, a hole, and a bar code.

23. The method of claim 11, wherein the carrier comprises any of a metal strip, a cardboard strip, a paper strip, a plastic strip, a polymeric material, and a cloth strip.

* * * * *